March 22, 1932. P. P. HORNI 1,850,173
TRAFFIC INDICATOR OR MARKER
Filed Oct. 3, 1930 6 Sheets-Sheet 1
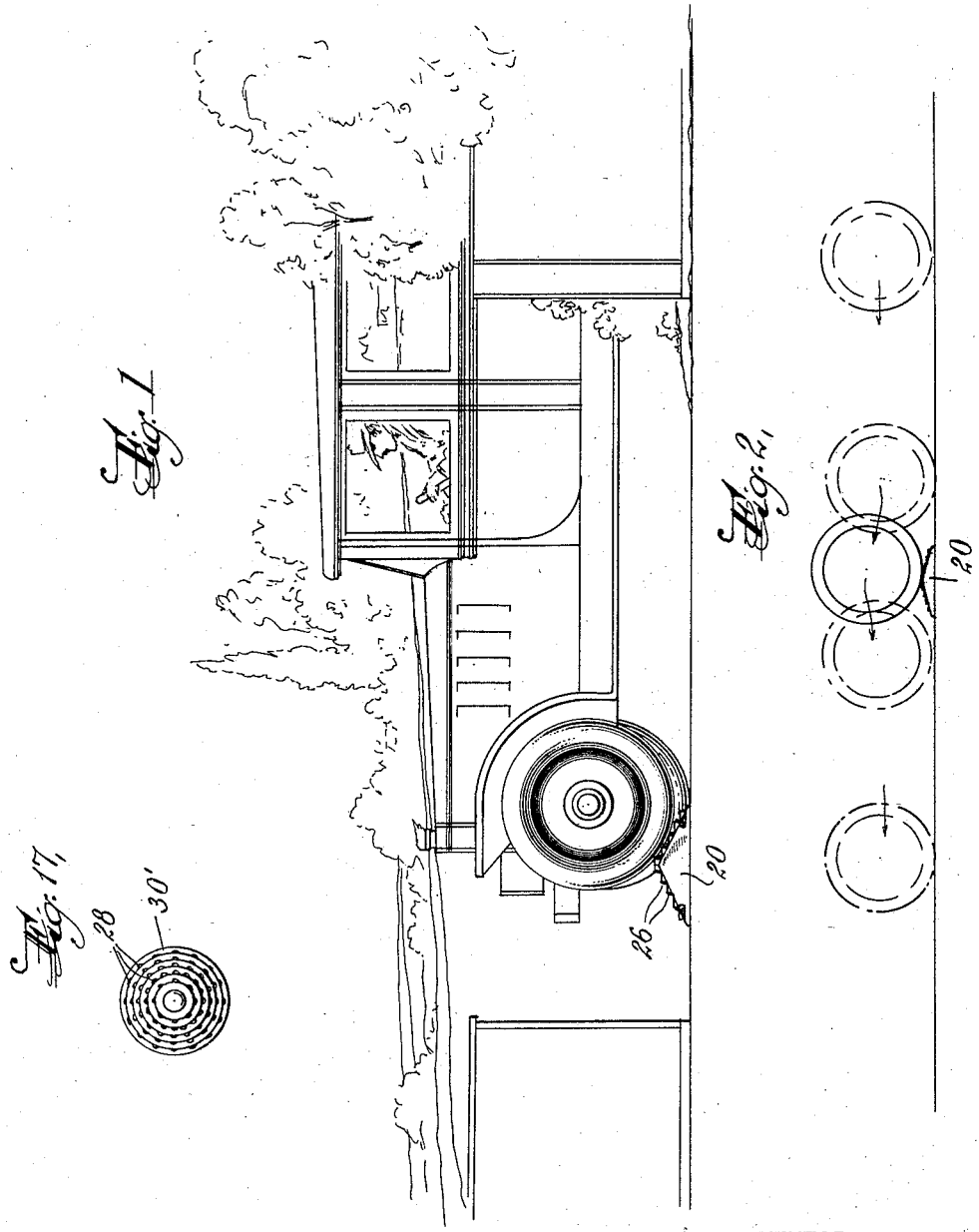
INVENTOR
Paul P. Horni
BY
ATTORNEYS March 22, 1932. P. P. HORNI 1,850,173
TRAFFIC INDICATOR OR MARKER
Filed Oct. 3, 1930 6 Sheets-Sheet 2
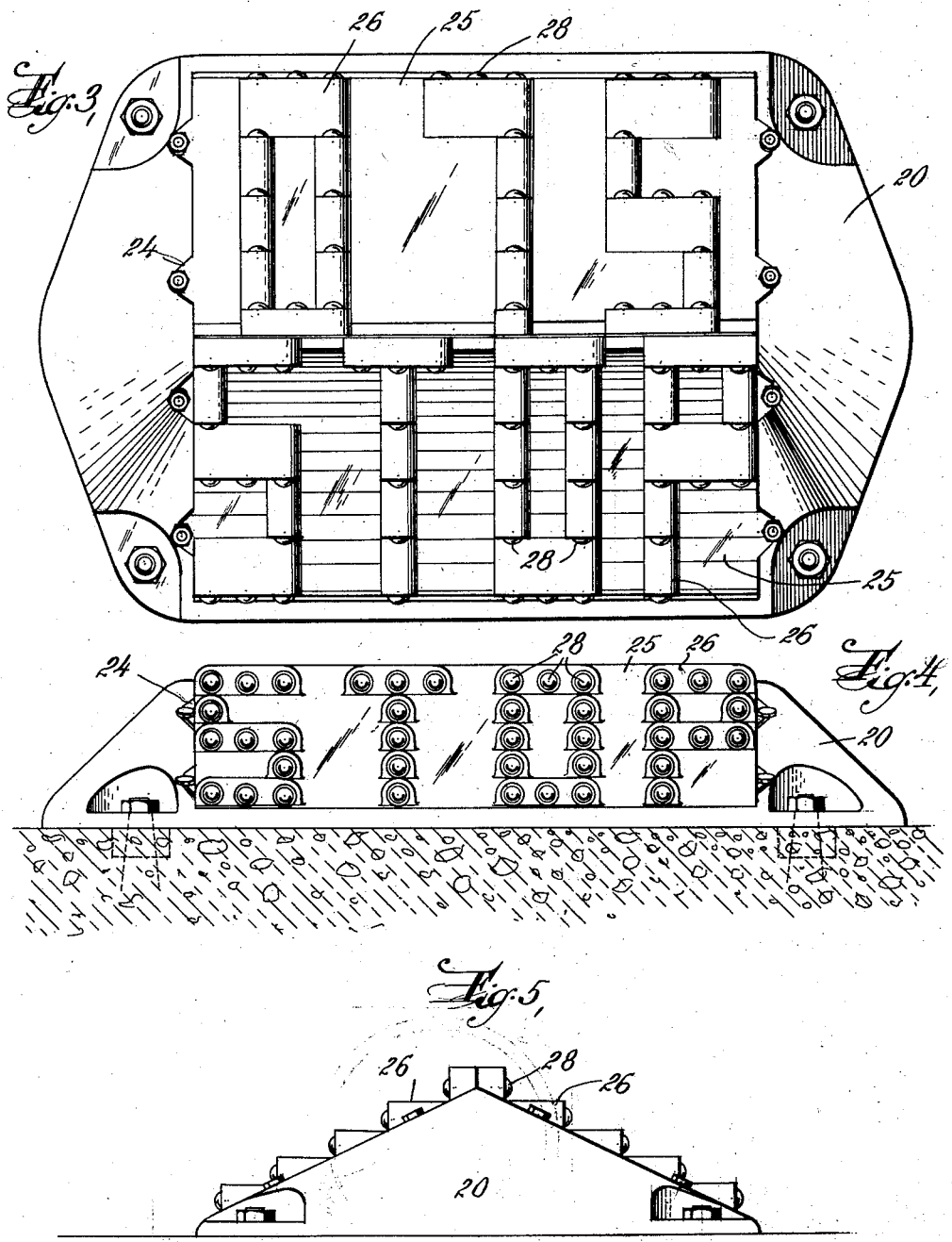

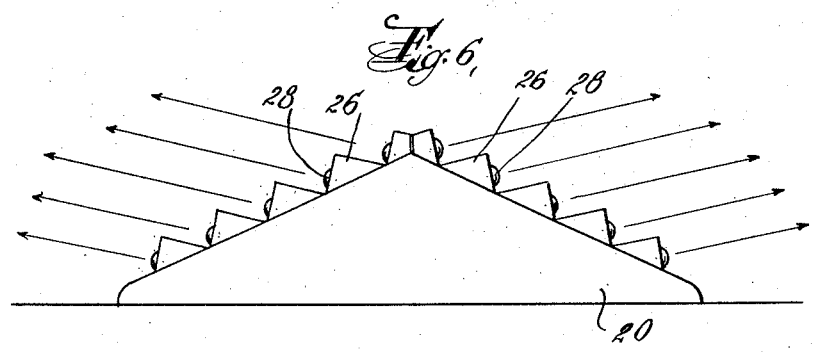
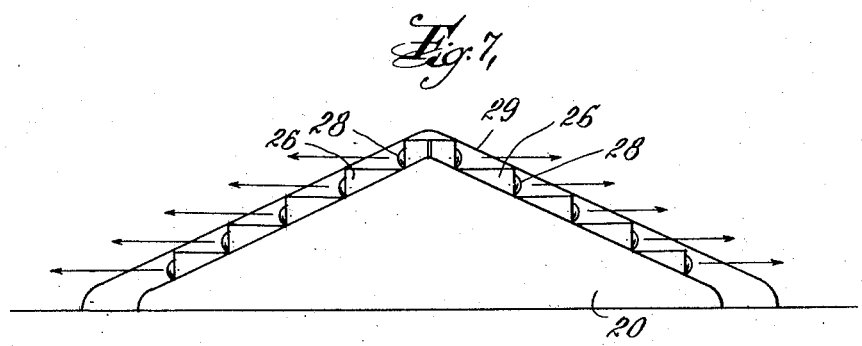
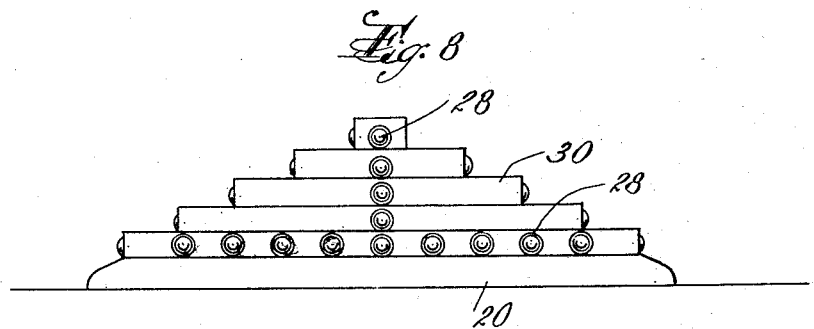

March 22, 1932. P. P. HORNI 1,850,173
TRAFFIC INDICATOR OR MARKER
Filed Oct. 3, 1930   6 Sheets-Sheet 4
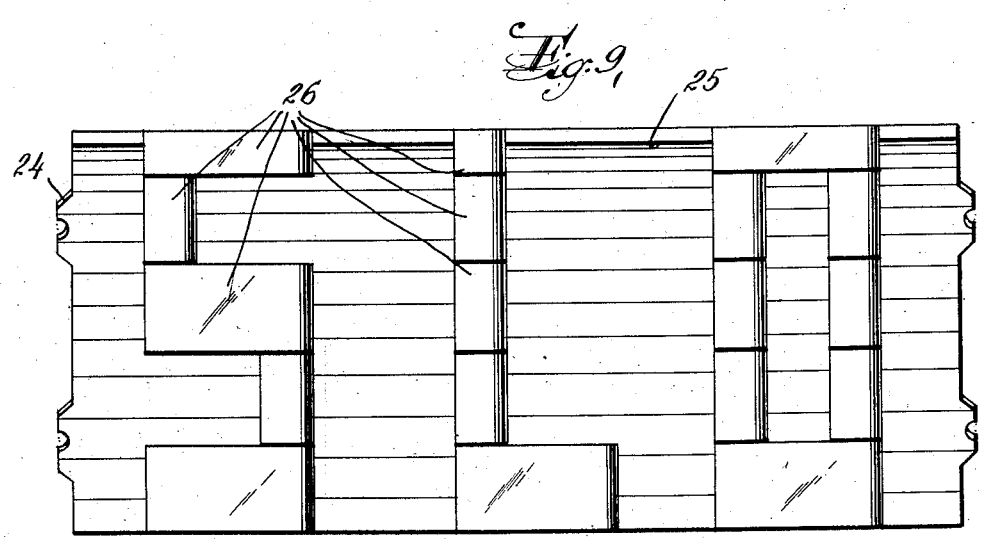
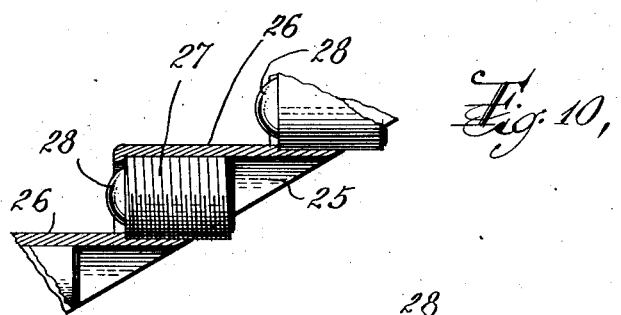
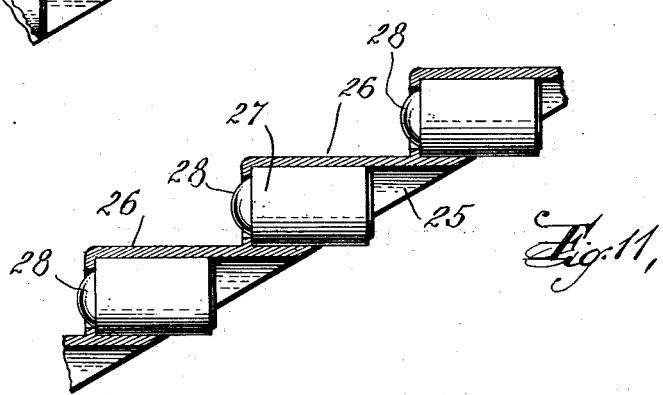
INVENTOR
Paul P. Horni
BY
ATTORNEYS

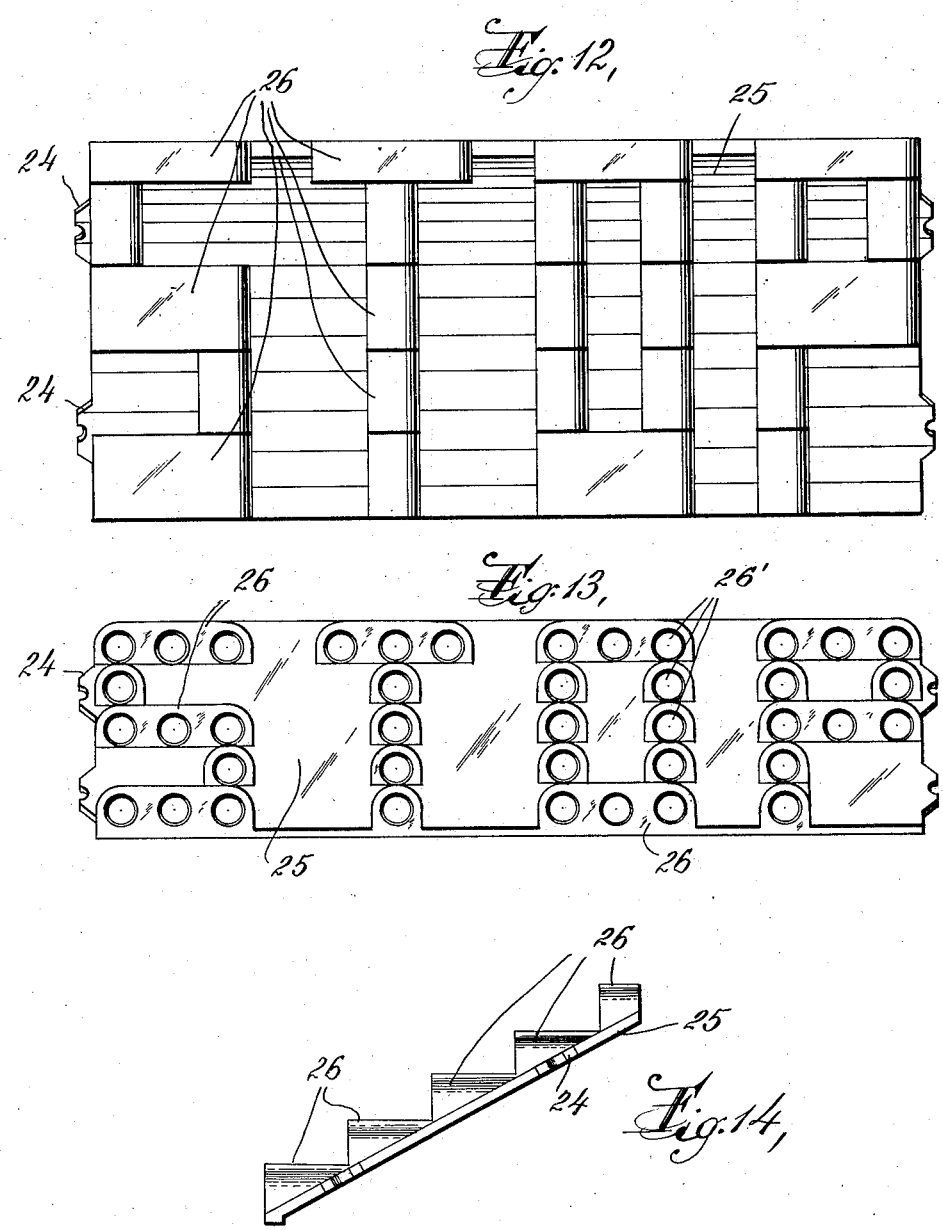

March 22, 1932. P. P. HORNI 1,850,173
TRAFFIC INDICATOR OR MARKER
Filed Oct. 3, 1930 6 Sheets-Sheet 6
Fig. 15,
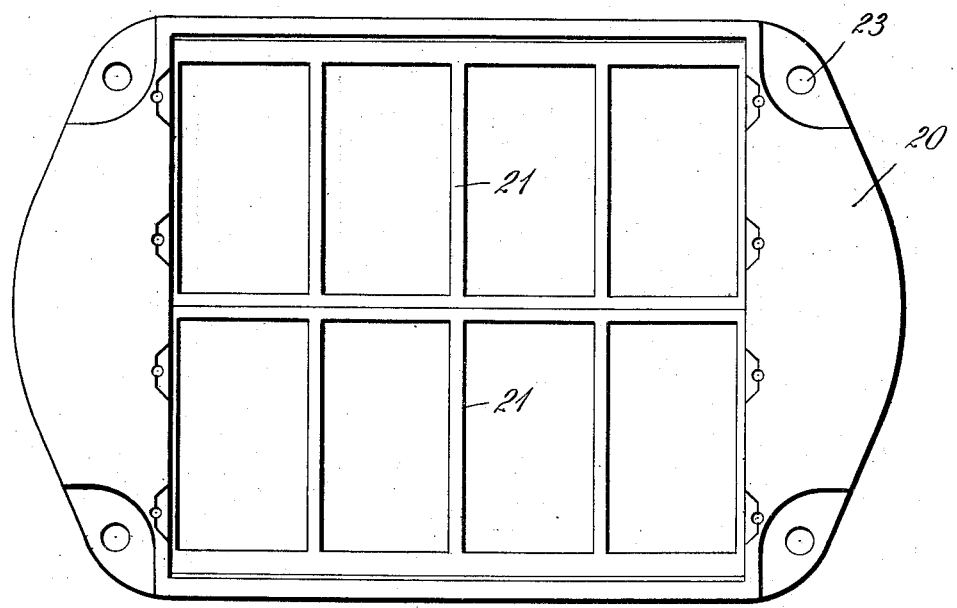
Fig. 16,
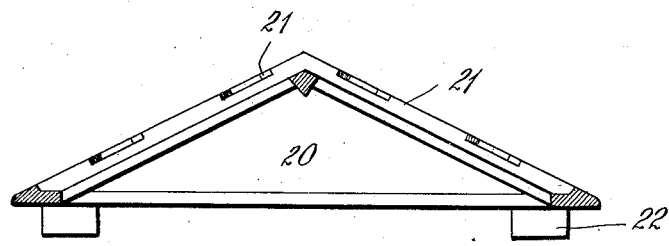
INVENTOR
Paul P. Horni
BY
Pennie, Davis, Marvin & Edmonds
ATTORNEYS Patented Mar. 22, 1932

1,850,173

UNITED STATES PATENT OFFICE

PAUL P. HORNI, OF NEWARK, NEW JERSEY

TRAFFIC INDICATOR OR MARKER

Application filed October 3, 1930. Serial No. 486,146.

This invention relates to a traffic indicator or marker, and has particular reference to that type of indicator or marker which is adapted to be mounted on the surface of a street or road to give warning or other information to approaching traffic.

Heretofore, traffic indicators or markers mounted on the surface of a street, road, or the like, were either mounted flush with the surface of the street and were thus only visible from above at short range, or else obstructions were mounted in the street bearing the traffic warning or other information, around which the vehicles had to be guided, and these markers were frequently in a position where they would not be readily seen unless the operator happened to glance in that direction.

Other forms of traffic markers consisted of rubber plates set vertically in the pavement and bearing some inscription, these rubber plates being arranged to be pushed over by the wheels of vehicles and as this happened practically continuously, they soon deteriorated and lost their resiliency so as to become useless. The last arrangement constituted a step in the right direction, in that it recognized that the best place to place a traffic marker is in the path of the vehicle to whom the warning signal or other information is directed, but those employed heretofore were not visible from any considerable distance, nor were they durable enough to last for a time sufficient to make their installation worth while.

It is the principal object of the present invention to overcome these objections to traffic markers or indicators used heretofore by providing a traffic marker adapted to be mounted on the surface of the pavement which is readable from a considerable distance to approaching vehicles, readable from the top as well, and is no obstruction to traffic, though placed directly in the path of the same. In addition to these functions, the new traffic marker or indicator of this invention has the advantages of being permanent, inexpensive, rugged, fool-proof, and one which requires no attention whatever beyond occasional inspection.

Accordingly, the traffic marker or indicator of this invention comprises a frame or support having at least one sloping ramp-like side, over which the wheel of a vehicle may pass without damage to the vehicle or injury to the support. In a preferred arrangement, the frame or support resembles a stepped pyramid or cone having ascending and descending ramp-like sides lying in the path of the traffic, this cone or pyramid having projections on its sloping sides which are arranged thereon so as to form a character or legend, visible not only to traffic approaching from the front, but also from directly above. Each projection preferably comprises a single dormer having a front face which is either vertical or inclined upwardly, in which is set a reflector for reflecting the rays from the head lights of approaching vehicles to illuminate the character or legend at night, or bull's eyes or lenses are used instead of the reflector and are illuminated from the rear by an electric lamp for the same purpose. During the day the projections, being preferably brightly colored, jointly trace the legend or character, which is thus visible from a considerable distance.

For a better understanding of this invention, reference is made to the accompanying drawings, in which Figure 1 illustrates the manner of mounting the traffic marker or indicator of this invention on the surface of a street or road in a manner in which it may be surmounted by vehicles;

Fig. 2 illustrates the action of a vehicle wheel surmounting the traffic marker of this invention;

Figs. 3, 4, and 5 are plan, front and side elevations, respectively, of the new traffic marker of this invention;

Figs. 6, 7, and 8 illustrate side elevations of modified forms of the same;

Figs. 9 to 14, inclusive, illustrate details of construction of the ramp-like plates of the traffic marker or indicator of this invention;

Figs. 15 and 16 illustrate the support or frame upon which the aforesaid plates are mounted; and Fig. 17 illustrates a plan view of another modified form of the indicator or marker of this invention.

Referring particularly to Figs. 15 and 16, these drawings show a frame or support 20, which has sloping sides 21 resembling a gable roof, these sloping sides 21 being adapted to merge gradually into the surface of the street or road on which this frame or support 20 is mounted, the cleats 22 on the lower surface thereof being adapted to be embedded in the surface of the street or road, while bolts, studs or other fastening means are adapted to be inserted through apertures 23 in the four corners for securely fixing the frame or support to the road bed, as illustrated in Figs. 3 to 5, inclusive.

Adapted to be secured by lugs 24 to the sloping surfaces 21 of frame or support 20, is a plate 25 shown in detail in Figs. 9 and 12 to 14, inclusive. It will be seen that these plates 25, when mounted on the frame 20, are inclined to the surface of the road, and serve as ramps over which a vehicle wheel may pass without damage to either the wheel or the marker, as shown in Figs. 1 and 2.

Arranged in tiers or independent rows on the plates 25 are the hollow projections 26, which are so arranged as to jointly form a character or legend, such as the words "Stop" and/or "Slo", one of these words being indicated on one sloping side of the marker and the other on the opposite sloping side of the marker as shown in Fig. 3. The projections 26 are shown in side elevation in Fig. 14, and it will be seen that they resemble dormer windows in that they project from the sloping plate 25, and have a substantially vertical front surface, which when viewed from directly in front cooperates with other adjacent projections 26 to form a legend, letter or character. Also, these projections 26 are arranged in reference to a horizontal plane in such a way that when viewed from the top they form the same legend, letter, or character as shown in Figs. 3, 9, and 12.

As illustrated in Figs. 13, the front or vertical surfaces of the projections 26 are provided with sockets 26' for the reception of luminous units 27, which may be either force fitted in place as shown in Fig. 11, or threaded in place as shown in Fig. 10. The luminous units 27 are preferably reflectors constituting a convex lens 28, backed by a mirror or other reflecting surface or having a rear surface silvered so that light rays directed upon the lens 28 are redistributed by the reflector to render the reflector luminous in appearance. Though reflectors are preferred, the lenses 28 may be open lenses or bull's eyes, and an electric lamp or the like mounted within the open frame 20 to illuminate the lenses and consequently the legend, letter, or character which they form.

When the plates 25 bearing the reflectors 27 in the corresponding projections 26 are emplaced on the frame or support 20, the traffic indicator or marker of this invention appears in plan as shown in Fig. 3, and in front and side elevation, respectively, as shown in Figs. 4 and 5. Though the projections 26 have been illustrated and described as being directed horizontally and as having vertical front indicating surfaces, they may be inclined upwardly as shown in Fig. 6 to reflect or direct rays of light upwardly at an angle to the level of the operators of the vehicles. Also, as shown in Fig. 7, the projections 26 and their reflector lenses 28, though made initially strong of cast metal or the like, may be further protected by placing them between ribs 29, which are engaged by the wheel of the vehicle as it passes over the marker instead of the projections 26.

In Fig. 8, is shown another modified arrangement, which resembles a pyramid in that instead of placing individual projections 26 on a sloping plate 25, the marker is formed in steps 30 like a pyramid, and reflectors are placed in the horizontal surfaces thereof to form any suitable character or legend in the manner described. Similar to the arrangement of Fig. 8 is the conical pyramid shown in plan in Fig. 17, in which the marker is made up of a series of steps 30, each studded with the lenses 28 to form any suitable design, legend, character or the like.

It will be seen that the new traffic marker or indicator of this invention has many advantages over those heretofore used in that it is durable, strong, and rigid. It is adapted to be placed directly in the path of the traffic to which the traffic warning or the like is directed so as to lie immediately in the normal line of vision of the operators of approaching vehicles, so that they will be certain to be warned or otherwise informed thereby. Although it is adapted to lie directly in the path of the traffic, it constitutes no obstruction thereto, because it is shaped so that vehicle wheels may pass readily thereover, and provides no more of an obstruction to traffic than a bump in the road bed. Also, inasmuch as the projections thereon form a legend, character, or word readable from two planes, that is, from the front and top, the information imparted thereby remains in the field of vision of the operator of the vehicle from a point considerably ahead of it to directly on top of it, and when these projections are illuminated either by reflected light or by light from within the marker, they are visible from a considerable distance, so that they are as apparent in the night time as they are in the day time, and in order to make them more visible in the day time, the front surfaces of the projections are preferably painted with a bright color. Inasmuch as the lenses of the luminous devices are placed on the vertical surface of the projections, they are not engaged by the circular wheels of the vehicle, and consequently are not damaged by any amount of traffic passing over the marker, and so, the reflectors or lenses, though placed where the vehicle wheels pass over them, are not injured or damaged thereby, nor is the painted front surface nor the glass of the lens readily obscured by dirt or the like, as the wheels do not come in contact therewith.

While a preferred embodiment of this invention has been illustrated and described herein, it is to be understood that it is not limited thereby, but is susceptible of many changes in form and detail within its scope.

I claim:

1. In a combined traffic marker and warning signal, the combination of a member adapted to be mounted in an inclined position on the surface of a road, and visual elements elevated on said member in spaced tiers and arranged to display a character or the like to a distant observer.

2. In a combined traffic marker and warning signal, the combination of a support adapted to be mounted upon the surface of a road or the like, and indicators elevated in stepped formation upon said support and arranged to display signal to a distant observer.

3. In a combined traffic marker and warning signal, the combination of a support adapted to be mounted upon the surface of a road or the like, and stepped projections upon said support serving as indicators protected from injury by the steps.

4. In a combined traffic marker and warning signal, the combination of a support adapted to be mounted upon the surface of a road or the like, and projections elevated in steps on said support to jointly form a character visible to approaching traffic.

5. In a combined traffic marker and warning signal, the combination of a support adapted to be mounted upon the surface of a road or the like, and a plurality of projections mounted upon said support in rows having progressively increasing elevations to jointly form with their front surfaces a character or the like visible from the front.

6. In a combined traffic marker and warning signal, the combination of a support adapted to be mounted upon the surface of a road or the like, and a plurality of single projections arranged upon said support to form two characters visible from two rectangular positions.

7. In a combined traffic marker and warning signal, the combination of a support adapted to be mounted upon the surface of a road or the like, and a plurality of single projections upon said support, each of said projections being visible from top and front positions and jointly cooperating to form two separate characters, one visible from one of said positions and the other visible from the other position.

8. In a combined traffic marker and warning signal, the combination of a support adapted to be mounted upon the surface of a road or the like, and a plurality of projections mounted upon said surface in rows having progressively increasing elevations, each of said projections having separate top and front visual surfaces.

9. In a combined traffic marker and warning signal, the combination of a support adapted to be mounted upon the surface of a road or the like, and a plurality of spaced projections of varying elevations mounted upon said support, said projections each having top surfaces arranged to jointly form a character visible from the top and front surfaces arranged to jointly form a separate character visible from the front.

10. In a combined traffic marker and warning signal, the combination of a support adapted to be mounted upon the surface of a road or the like, a plurality of projections arranged in steps upon said support, and a reflector mounted on each of said projections and arranged to form a character or the like, said reflectors being protected from injury by the edges of said projections.

11. A combined traffic marker and warning signal comprising an elevation on the surface of the road and having at least one sloping side, a plurality of laterally-directed indicators mounted one above the other upon the sloping side of said elevation, and ridges over said indicators to protect them from injury.

12. A combined traffic marker and warning signal comprising a stepped pyramid adapted to be mounted upon the surface of a road or the like, reflectors arranged on the lateral surfaces of the pyramid steps to form a character visible to approaching traffic, and ridges over said indicators to protect them from injury.

13. A combined traffic marker and warning signal comprising a frame adapted to be secured to the surface of a road or the like, a plate secured in an inclined position on said frame, a plurality of single projections on the upper surface of said plate, each of said projections having a front wall, and a reflector mounted in the front wall of each of said projections.

14. A combined traffic marker and warning signal, comprising a frame adapted to be secured to the surface of a road or the like, a plurality of dormer like projections arranged in step relation on said frame, a plurality of reflectors mounted in said projections and arranged to form a character visible to a distant observer, and ribs on said frame lying between said projections to protect their reflectors from injury.

In testimony whereof I affix my signature.

PAUL P. HORNI.